(12) United States Patent
Cha et al.

(10) Patent No.: US 11,705,131 B2
(45) Date of Patent: Jul. 18, 2023

(54) SYSTEM AND METHOD FOR IDENTIFYING SPOKEN LANGUAGE IN TELECOMMUNICATIONS RELAY SERVICE

(71) Applicant: Mezmo Corporation, Buena Park, CA (US)

(72) Inventors: WonJae Cha, Yongin-si (KR); John H. Lee, Culver City, CA (US)

(73) Assignee: Mezmo Corporation, Buena Park, CA (US)

(*) Notice: Subject to any disclaimer, the term of this patent is extended or adjusted under 35 U.S.C. 154(b) by 270 days.

(21) Appl. No.: 17/195,504

(22) Filed: Mar. 8, 2021

(65) Prior Publication Data

US 2022/0284903 A1 Sep. 8, 2022

(51) Int. Cl.
*G10L 15/22* (2006.01)
*G10L 15/26* (2006.01)
*H04M 1/72448* (2021.01)
*G10L 15/183* (2013.01)

(52) U.S. Cl.
CPC ............. *G10L 15/26* (2013.01); *G10L 15/22* (2013.01); *H04M 1/72448* (2021.01); *G10L 15/183* (2013.01); *H04M 2201/40* (2013.01)

(58) Field of Classification Search
CPC ......... H04M 3/42391; H04M 1/72448; H04M 2201/40; G10L 15/22; G10L 15/32; G10L 15/005; G10L 15/26; G10L 15/183; G06Q 10/1095

USPC ........................................................ 704/275
See application file for complete search history.

(56) References Cited

U.S. PATENT DOCUMENTS

| 2005/0094775 A1* | 5/2005 | Smith ............... H04M 3/42391 379/52 |
| 2018/0374476 A1* | 12/2018 | Lee .......................... G10L 15/22 |
| 2021/0081878 A1* | 3/2021 | Brunn ................ G06Q 10/1095 |

* cited by examiner

*Primary Examiner* — Md S Elahee
(74) *Attorney, Agent, or Firm* — Heedong Chae; Lucem, PC (57) ABSTRACT

A system for identifying spoken language in a telecommunications relay service, which includes a call serving entity; and a plurality of automatic speech recognition groups where each of the automatic speech recognition groups includes an associated automatic speech recognition engine that recognizes and transcribes speech to a predefined language. One of the plurality of automatic speech recognition groups is set as a default automatic speech recognition group and automatic speech recognition engines transcribe and convert peer voices into text packets. The text packets are scored by the automatic speech recognition engine and transmitted to the call serving entity to determine whether the text packets meet a predetermined threshold based on their respective scores with the text packet having the highest score that meets or exceeds the predetermine threshold transmitted to a user.

16 Claims, 4 Drawing Sheets

SYSTEM AND METHOD FOR IDENTIFYING SPOKEN LANGUAGE IN TELECOMMUNICATIONS RELAY SERVICE

FIELD OF THE INVENTION

The present invention relates to a telecommunications relay system ("TRS"), and more particularly, a TRS which provides a closed-caption service for hearing-impaired user using Automated Speech Recognition ("ASR") that automatically recognizes multiple languages and transcribes the language of the other party without intervention from the hearing-impaired user.

BACKGROUND OF THE INVENTION

Telecommunication relay services ("TRS") for hearing-impaired individuals enable those individuals to communicate to others who are not significantly hearing-impaired via services that include Internet Protocol ("IP") Relay Services, IP Captioned Telephone Services ("CTS"), and Voice Relay Services ("VRS"). A typical TRS transmits the voice of the other party or peer (i.e. audio) to a call agent who then transcribes the text. The call agent then transmits the transcribed text to the TRS, which will then transmit the transcribed text to various communication terminals of the hear-impaired user for the hearing-impaired user to read. This service enables voice calls between the hearing-impaired user and the other party to be communicated via text. Generally, the term "hearing-impaired" describes people with any degree of hearing loss (from mild to profound), and thus hearing-impaired individuals include those who are hard-of-hearing, deaf, or deafened.

When a single language is the common language of the country or locale, the call agent only needs to transcribe the voice call into text based on the common language. Therefore, the languages of incoming and/or outgoing calls are easily predicted. However, when the country or locale has multiple languages in common use, there could be multiple switching of call agents if the first call agent reached is not multi-lingual or has little to no knowledge of the language of the peer. This problem may require an additional process where the hearing-impaired recipient of the call (also, the user of the TRS) may be required to intervene by requesting a change of the user's assigned call agent to another call agent fluent in the language of the peer. This situation can lead to long latencies/delays, and thus, form a bottleneck during the call session that results in inconvenience to the hearing-impaired user and the peer alike. This situation is illustrative of the inefficiencies of the typical TRS for hearing-impaired users.

Conventionally during a call session, the peer's voice is first directly transmitted to the hearing-impaired user (the call recipient) and then the voice data is transmitted from the hearing-impaired user to the TRS for transcription with a minimum round trip delay of 300 ms. If the round trip delay is greater than 200 ms, then the hearing-impaired user may feel that the call breaking is up on them or that the call session is slightly delayed or more. Such delays of over 200 ms are detrimental to the user experience with the conventional TRS system.

Therefore, to overcome the above problems, various embodiments of a TRS system and method are provided, as there is a need for a system or method that accomplishes the goal of ensuring that communication between the peer and the hearing-impaired user proceeds with minimal disruptions, delays, or interventions from either party. This invention is directed to solve these problems and satisfy the long-felt need.

SUMMARY OF THE INVENTION

The present invention contrives to solve the disadvantages of the prior art. The present invention provides a TRS that provide closed-captioning service for the hearing-impaired via automatic detection of the spoken language and use of ASR to automatically transcribe the language spoken by the peer to the hearing-impaired TRS user with low latency whether the peer is making the call to the hearing-impaired TRS user or the hearing-impaired TRS user is making the call to the peer.

The object of the invention is to provide a system for identifying spoken language in a telecommunications relay service ("TRS") wherein automatic speech recognition ("ASR") engines transcribe and convert peer voices into text packets, and the text packets are transmitted to a user, the system comprising: a call serving entity; and a plurality of ASR groups, each of the ASR groups including an associated ASR engine that recognizes and transcribes speech to a predefined language. One of the plurality of ASR groups is set as a default ASR group.

The call serving entity is configured to: establish and release a voice path between the call serving entity and a peer, and a voice path between the call serving entity and the plurality of ASR groups; establish and release a data path between the call serving entity and the user, and a data path between the call serving entity and the plurality of ASR groups; receive the peer voices via the voice path and transmit the peer voices to the default ASR group, wherein the peer voices are transcribed and converted into the text packets by the default ASR group; receive the text packets from the default ASR group; set, unset, or maintain the default ASR group; and transmit the text packets to the user via the data path and/or discard the text packets.

Another object of the invention is to provide a system for identifying spoken language in a telecommunications relay service ("TRS") wherein automatic speech recognition ("ASR") engines transcribe and convert peer voices into text packets and the text packets are transmitted to a user, the system comprising: a call serving entity; and a plurality of ASR groups, each of the ASR groups including an associated ASR engine that recognizes and transcribes speech to a predefined language.

The call serving entity is configured to: establish and release a voice path between the call serving entity and a peer, and a voice path between the call serving entity and the plurality of ASR groups; establish and release a data path between the call serving entity and the user, and a data path between the call serving entity and the plurality of ASR groups; receive the peer voices via the voice path and transmit the peer voices to the plurality of ASR groups; receive the text packets from the plurality of ASR groups via the data path; set, unset, or maintain a default ASR group; and transmit the text packets to a user and/or discard the text packets.

Yet another object of the invention is to provide a method for identifying spoken language in a telecommunications relay service ("TRS") wherein automatic speech recognition ("ASR") engines transcribe and convert a peer voice into text packets and the text packets are transmitted to a user, comprising the steps of: transmitting a peer voice from a call serving entity to a default ASR group or a plurality of ASR groups; receiving text packets that are generated by the default ASR group or the plurality of ASR groups; checking confidence levels of each of the text packets; determining the default ASR group; transmitting the text packets to the user and/or discarding the text packets.

The advantages of the present invention are: (1) reduction latency times between receiving the peer voice from the peer and sending the text transcription to the hearing-impaired recipient, thus increasing the efficiency of the TRS and improving the user experience for the hearing-impaired recipient and peer alike; (2) high fidelity text transcription by necessitating the text transcription to be scored with a confidence level with the confidence level having to meet and/or exceed a predetermined confidence level threshold; (3) a call server entity that is configured to manage a number of ASR groups and their ASR engines automatically, determine the fidelity of the contents of the text packets via their respective scores (e.g. confidence levels), and selecting and sending the appropriate text packet to the hearing-impaired user for viewing; (4) the call server entity providing low operating costs due to the increased automation provided; (5) improving the speed of the system by implementing a plurality of ASR groups with having their own ASR engine where the system has multiple ASR groups that simultaneously transcribe the peer voice to text packets based on the languages recognized by the respective ASR engines included in the ASR group via a multi-threaded approach; (6) narrows the gap of user experience in telecommunications between hearing-impaired and non-hearing-impaired individuals; (7) minimization of any interaction required by the hearing-impaired user as the system is configured to handle multiple languages during call sessions automatically; (8) automatically identifying the spoken language of the peer and determining the default ASR group; and (9) the system is operative during calls between the hearing-impaired TRS user and the peer whether the peer is calling the TRS user or the TRS user is calling the peer.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
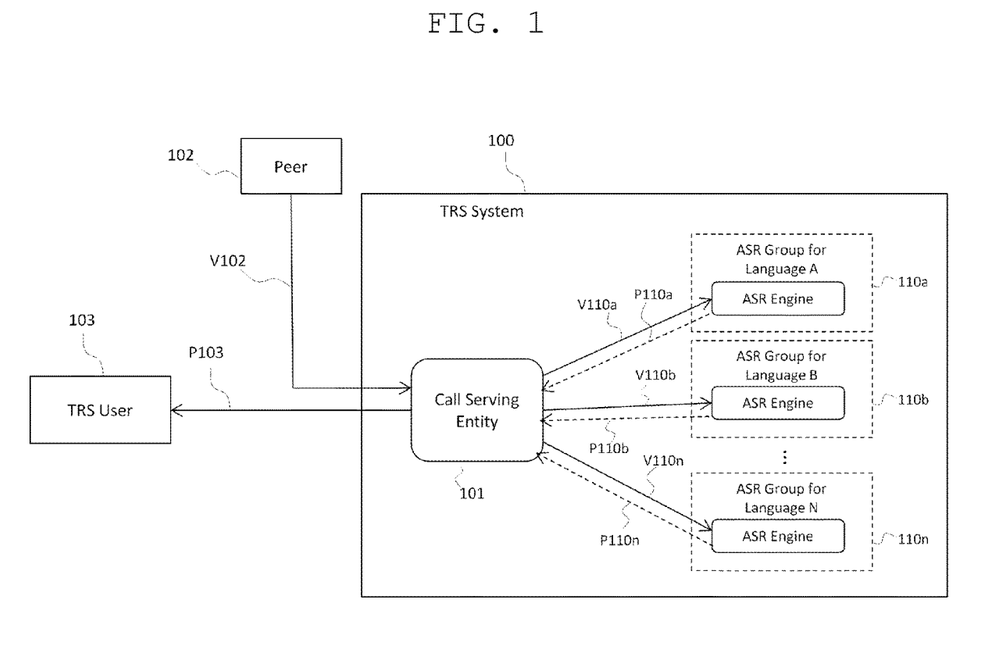
FIG. 1 is a schematic diagram of a TRS system according to embodiments of the present invention.

FIG. 1 illustrates an embodiment of a system for identifying spoken language in a telecommunications relay service ("TRS") wherein automatic speech recognition ("ASR") engines transcribe and convert peer voices into text packets, and the text packets are transmitted to a user (103), the system including a call serving entity (101); and a plurality of ASR groups (110), each of the ASR groups including an associated ASR engine that recognizes and transcribes speech to a predefined language. One of the plurality of ASR groups (110) is set as a default ASR group. The call serving entity (101) is configured to: establish and release a voice path (V102) between the call serving entity (101) and a peer (102), and a voice path (V110) between the call serving entity (101) and the plurality of ASR groups (110); establish and release a data path (P103) between the call serving entity (101) and the user (103), and a data path (P110) between the call serving entity (101) and the plurality of ASR groups (110); receive the peer voice via the voice path (V102) and transmit the peer voice to the default ASR group (here, the peer voice is transcribed and converted into the text packets by the default ASR group); receive the text packets from the default ASR group; set, unset, or maintain the default ASR group; and transmit the text packets to the user (103) via the data path (P103) and/or discard the text packets. The terms "voices," "frames," and "packets" that are stated in this embodiment and any other embodiments hereinafter shall include both plural and singular forms of these respective terms; likewise, the terms "voice," "frame," and "packet" shall include both plural and singular forms of these respective terms.

The peer voice in this and any embodiment described hereafter is a form of audio. The term "audio" is audio in any format that includes (but is not limited to) analog formats, digital formats, and a propagating wave format. The digital formats may be uncompressed or compressed, the latter of which may be lossless compression or lossy compression. Furthermore, audio may be used to describe sounds that may include spoken words or informal speech; audio may be a part of a video communication or audio communication. The audio may be transmitted via any wired and/or wireless means known in the art. The source of the peer voice is typically from a party other than the TRS user whether the call is inbound to or outbound from the TRS user.

The peer voice includes a first voice frame, second voice frame, third voice frame, fourth voice frame, . . . Nth voice frame where N is an integer. The first, second, third, fourth, . . . Nth voice frame represents the peer voice of a call session over a time domain that are transcribed into the first, second, third, fourth, . . . Nth text packets respectively by an ASR engine of an ASR group and these text packets are individually scored by the ASR engine. This score provided by the ASR group represents the confidence level of the transcription for the respective text packet. Accordingly, the text packet may include first, second, third, fourth, . . . Nth text packets that are provided by the first ASR group (110a). For proper sequencing and delivery of the text packets to the user, timestamp data will be provided by the ASR engine for each text packet. The phone used for any call in this embodiment may be a cell phone, a touch-tone phone, a rotary phone, a voice over internet protocol (VoIP) phone, or any device used for voice communications between two or more parties.

Figure 2:
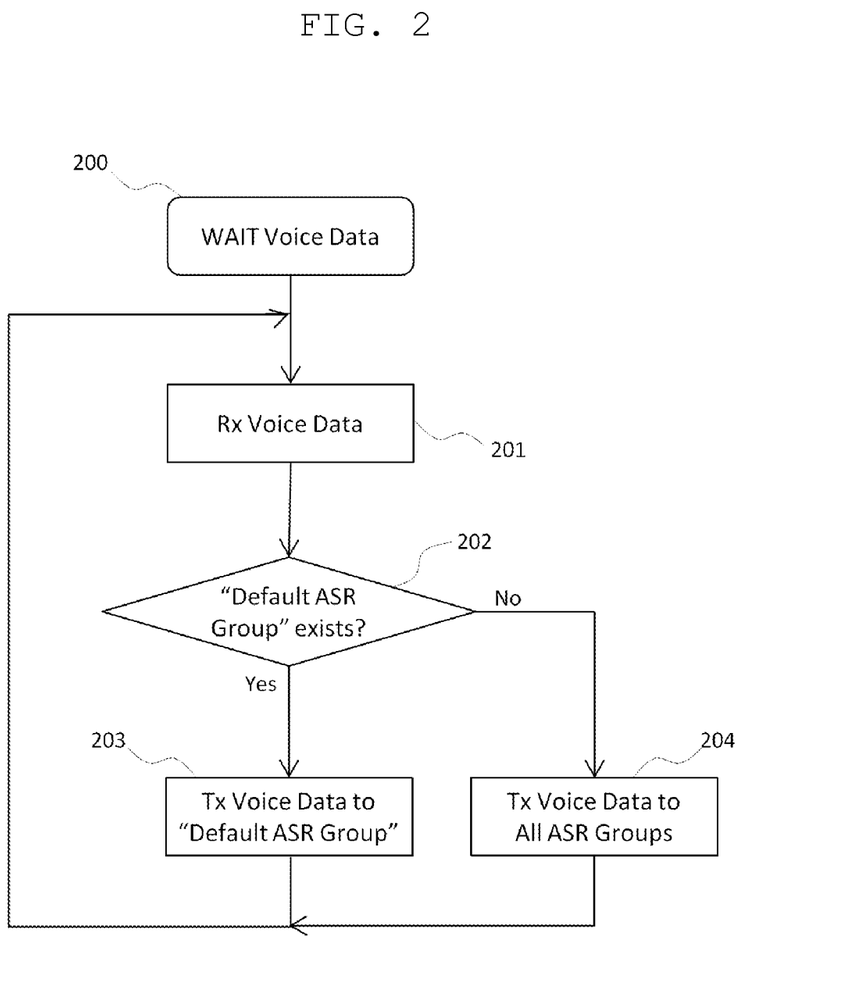
FIG. 2 is a flow diagram of an algorithm for receiving or transmitting the voice frame/voice data according to embodiments of the present invention.

FIG. 2 shows how the call serving entity (101) of the TRS (100) processes the peer voice received from the peer (102). The TRS (100) sends the peer voice from the peer (102) to the call serving entity (101) that is assigned to the call. The call serving entity (101) waits (200) for the peer voice from the TRS (100). After receiving (201) the peer voice, the call serving entity (101) checks (202) the default ASR group after receiving the peer voice or while waiting for the peer voice to arrive from the TRS (100). If the default ASR group is set, then the peer voice is transmitted (203) only to the default ASR group. The default ASR group is at least one ASR group, so the default ASR group may be a plurality of ASR groups, and thus, the default ASR group may be configured to transcribe the peer voice in multiple languages from the plurality of ASR groups included therein. For example, the default ASR group may be include ASR group for language A and ASR group for language B, so first, second, . . . Nth text packets from ASR group for language A and first, second, . . . Nth text packets from ASR group for language B receives confidence levels from their respective ASR engines. If the default ASR group is not set, then the call serving entity (101) sends (204) the peer voice to the plurality of ASR groups for transcription and scoring by the ASR engines of those respective ASR groups. The text packets with highest confidence level equal or above a predetermined threshold from any of those ASR groups cause the call serving entity (101) to set the ASR group producing text packets with that confidence level as the default ASR group. The call serving entity (101), as configured in FIG. 2, is set to wait (200) for the peer voice and perform the steps (202, 203; or 202, 204) once the peer voice is received (201) by the call serving entity (101). Following the transmission of the peer voice to the default ASR group (203) or transmission (204) of the peer voice to all ASR groups, the call serving entity (101) is configured to wait for any additional voice data (200) and be prepared to receive (201) any voice data from the current call session, a previous call session that may be on hold, or an upcoming call session, this preparedness is indicated by arrow(s) leading back to the reception (201) of the peer voice as shown in FIG. 2.

In greater detail, the first ASR group (110a) for language A produces the first text packet for language A via the ASR engine of the first ASR group that transcribed the first voice frame to the first text packet, the first ASR group (110a) for language A also produces the second text packet via the ASR engine of the first ASR group that transcribed the second voice frame to the second text packet, the first ASR group (110a) also produces the Nth text packet via the ASR engine of the first ASR group transcribing the Nth voice frame to the Nth text packet. The ASR engine of the first ASR group scores the transcription fidelity for each of these text packets as confidence levels and provide timestamps so that the text packet will ultimately be delivered to the user (103) in proper sequential order. As described above, the default ASR group may include multiple ASR groups for multiple languages. Accordingly, the default ASR group can transcribe the peer voice into multiple text packets and score the confidence level for these multiple text packets and the timestamp data ensures that the text packets are delivered to the user (103) to view and follow the conversation, potentially near or at real-time.

Figure 3:
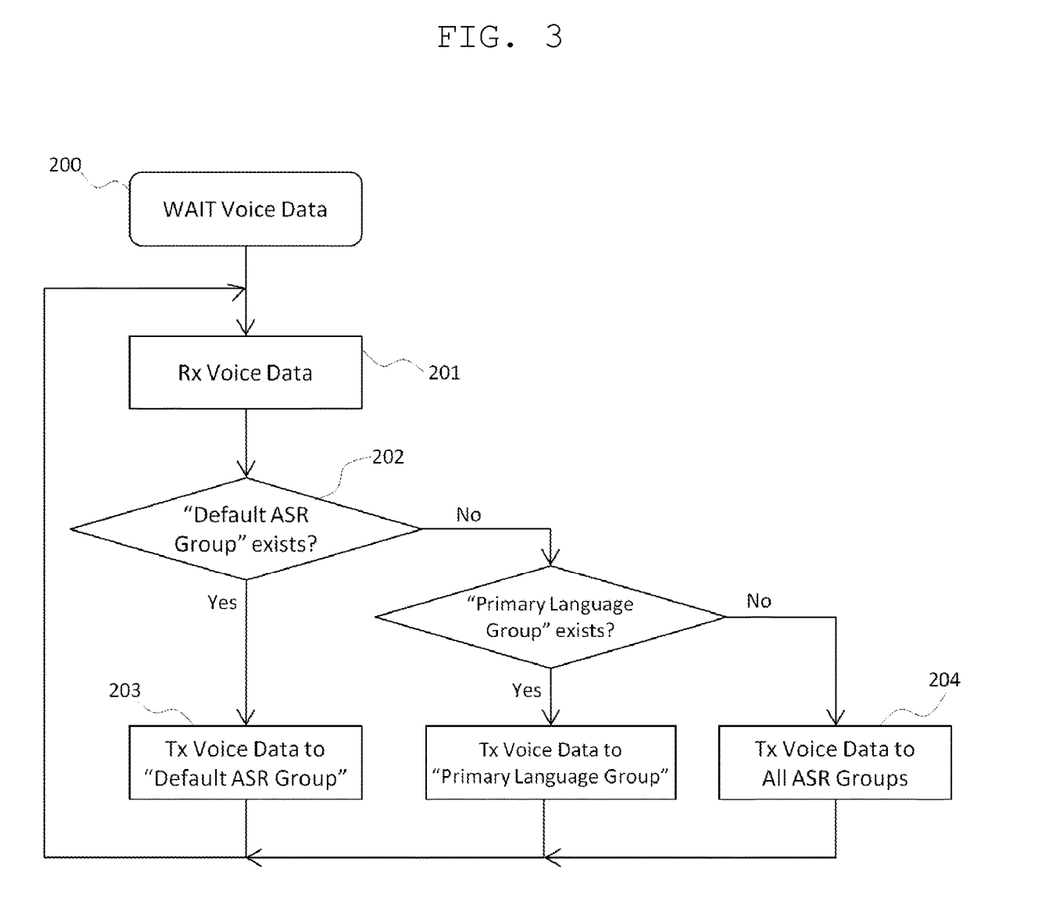
FIG. 3 is a flow diagram of an algorithm for identifying language or an appropriate ASR group according to embodiments of the present invention.

In FIG. 3, the plurality of ASR groups (110) may further include a primary language group. The primary language group includes one or multiple ASR groups that transcribe most commonly used languages in the geographic location of the user, the location may be determined by global position system ("GPS") information obtained by the TRS (100) via the Internet-of-Things (IoT). After receiving (201) the peer voice, the call serving entity (101) determines (202) whether the default ASR group exists, or is set. If the default ASR group exists, then the call serving entity (101) transfers (203) the voice frame(s) of the peer voice to the default ASR group. If the default ASR group does not exist, then the call serving entity (101) determines whether the primary language group exists. If the primary language group exists, then the call serving entity (101) sends the voice frame(s) of the peer voice to primary language group that includes one or multiple ASR groups. If the primary language group does not exist, or is not configured as shown in FIG. 2, then the call serving entity (101) sends (204) sends the voice frame(s) of the peer voice to all ASR groups. Following the transmission of the peer voice to the default ASR group (203), transmission of the peer voice to the primary language group, or transmission (204) of the peer voice to all ASR groups, the call serving entity (101) is configured to wait for any additional voice data (200) and be prepared to receive (201) any voice data from the current call session, a previous call session that may be on hold, or an upcoming call session, this preparedness is indicated by arrow(s) leading back to the reception (201) of the peer voice as shown in FIG. 3.

With respect to designating the default ASR group, this designation may be made from a number of methods: user selection during initialization/setup of the system, automated system selection based on any information provided by the user when signing up for (or subscribing to) the service provided by the system, or the peer may be prompted to select the language of which will designate the corresponding ASR group as the default ASR, the selection of which will be stored for that phone number. Another method is the system automatically determining the default ASR group during the call session, specifically the call serving entity (101) checking the confidence levels of the first text packet or the first few text packets produced by their respective ASR groups where the ASR group with the highest scoring text packet(s) at or above a confidence level will be set as the default ASR group. Furthermore, the system is operative during calls between the TRS user and the peer whether the peer is calling the TRS user or the TRS user is calling the peer. As the system receives more incoming calls from different peers or outgoing calls from the user, the default ASR group may be changed automatically by the call serving entity (101) based on the previous call history by analyzing the confidence intervals that are scored to individual ASR groups for that particular phone number of the peer (whether the call is inbound from the peer or outbound to the peer), where each ASR group corresponds to a different language. For example, if English is selected as a default ASR group during initialization or during setup of the system and a majority of incoming and/or outgoing calls are transcribed with high confidence levels from an ASR group different that was not assigned as the default ASR group, then the ASR group with text packets of the highest confidence levels may be automatically selected as the default ASR group by the call serving entity (101) going forward.

Figure 4:
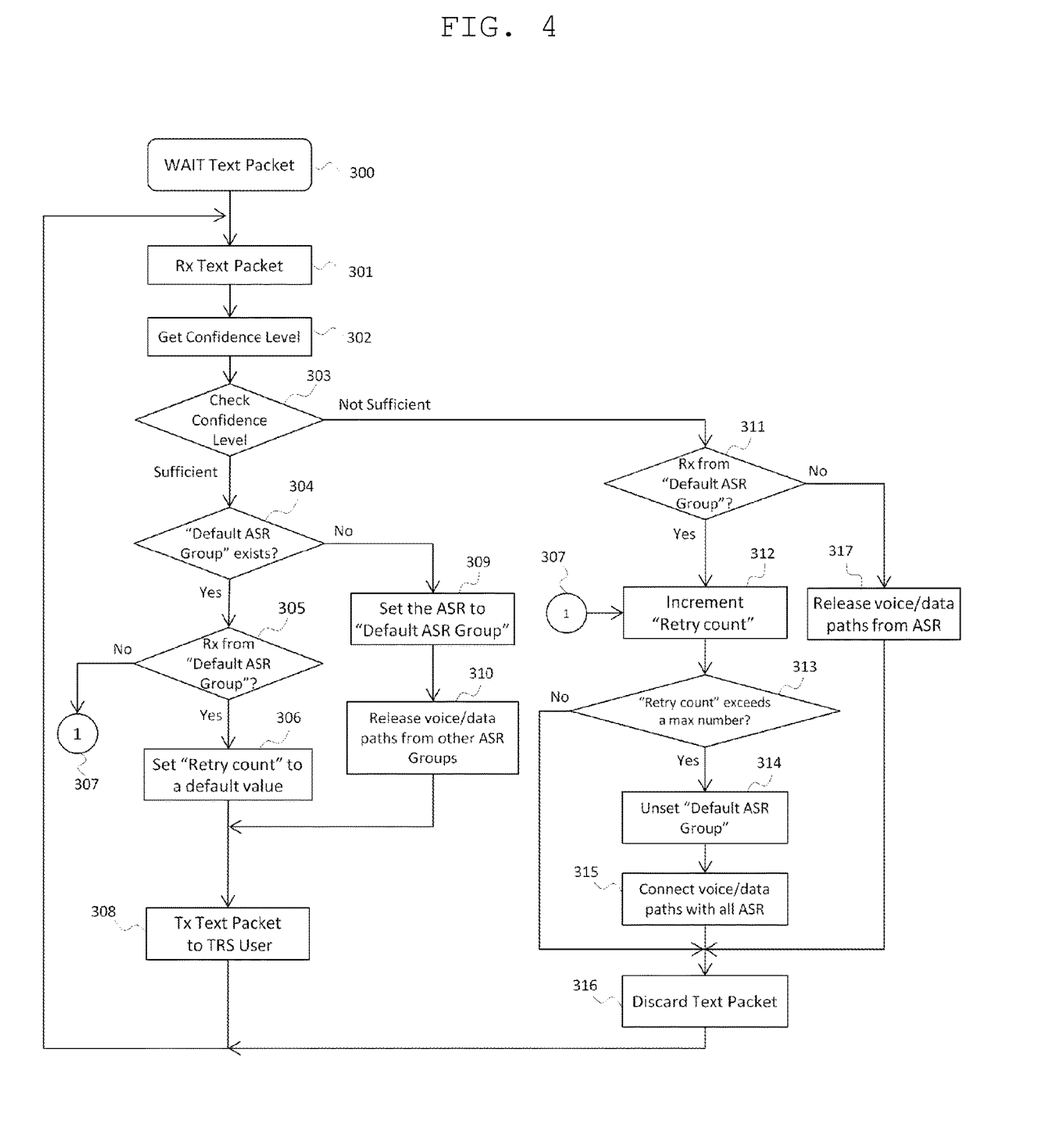
FIG. 4 is a flow diagram demonstrating a method of selecting the appropriate ASR group according to embodiments of the present invention.

As shown in FIGS. 1 and 4, the call serving entity (101) is configured to check (303) a confidence level of each text packet received from the default ASR group or from any of the plurality of ASR groups (110). The call serving entity (101) is configured to wait (300) for any text packet that are received (301) from a default ASR group, primary language group, or any other ASR groups. The call serving entity (101) will read on any confidence level for individual text packets as they are received by the call serving entity (101). Any text packet received (305) from the default ASR group is transmitted (308) to the user (103) via the data path (P103) (and in proper order via the time data included in the timestamps of the text packets) and the default ASR group is maintained if the confidence level is higher than the predefined level. Alternatively, the confidence level may be equal or higher than the predefined level. The maintainer of the system may adjust the system configuration if so desired. Confidence levels are determined by each ASR engine and are transmitted with the text packets to the call serving entity (101). Furthermore, any text packets received from the default ASR group or the plurality of ASR groups (110) is discarded if the confidence level is lower than a predefined level. As mentioned above, the confidence levels for each text packet are determined by the ASR group that provided and transmitted the text packets to the call serving entity.

As shown in FIG. 4, if the confidence level of a first text packet received from the default ASR group is lower than the predefined level (311), then the call serving entity (101) is configured to increase a retry count incrementally (312) (shown via sequence 307, 312), and receive a second text packet from the default ASR group. The retry count is set to zero by default and that the incremental increase of the retry count by the call serving entity (101) is preferably increased by one with each incremental increase. For example, if the confidence level of the Nth text packet (here, N=1, 2, 3, . . . N) transcribed from the respective Nth voice frame by the default ASR group is lower than the predefined level, the call serving entity (101) is configured to increase a retry count incrementally (again, preferably increased by one). If the retry count exceeds (313) a predefined maximum number, the call serving entity (101) is configured to unset (314) the preexisting default ASR group, transmit (315) the Nth voice frame to the plurality of ASR groups (110), and receive the Nth text packet (here, N=1, 2, 3, . . . N) from the plurality of ASR groups (110). The Nth voice frame can be sent to all ASR groups including the previous default ASR, or sent to all ASR groups except the previous default ASR. Preferably, the Nth voice frame is sent to all of the ASR groups including the previous default ASR because there's a chance that the ASR engine could not transcribe peer voice due to background noise, pronunciation error, etc. Preferably, predefined maximum number for the retry count is 3. While N may equal 1, 2, 3, . . . N as described here, preferably N is 2 to keep any latency low.

If the confidence level of the first text packet is not sufficient and is not received from the default ASR group, then the call serving entity (101) releases (317) the peer voice/data paths from the ASR groups, and discards (316) the first text packet as shown in FIG. 4. Furthermore, as shown, the call serving entity will wait (300) to receive (301) the next incoming text packet following the transmission (308) of a text packet to the TRS user or the discarding (316) of the text packet, this preparedness is indicated by arrow(s) leading back to the reception (301) of the text packet as shown in FIG. 4.

The call serving entity (101) is configured to set (309) the ASR group that transcribed the Nth voice frame into the Nth text packet, which has the confidence level higher than the predefined level, as the default ASR group, release (310) peer voice/data paths from other ASR groups, and transmit (308) the Nth text packet to the user (103). Further, the call serving entity (101) is configured to reset (306) the retry count to a default value which is preferably zero following the assigned of the ASR group as the default ASR group. As mentioned above, the plurality of ASR groups (110) may further include a primary language group. If the confidence level of an Nth text packet transcribed from an Nth voice frame by the default ASR group is lower than the predefined level, then the call serving entity (101) is configured to increase a retry count incrementally (312). If the retry count exceeds (313) a predefined maximum number, then the call serving entity (101) is configured to unset (314) the default ASR group, transmit the Nth voice frame to the primary language group, and receive the Nth text packet from the primary language group. The Nth text packet may be one or plurality of text packets, each transcribed from the respective ASR engines of the primary language group that includes one or more ASR group.

The call serving entity (101) may be further configured to check the confidence level of the Nth text packet received from the primary language group. Here, if the confidence level of any Nth text packet is higher than the predefined level, then the call serving entity (101) is configured to set the ASR group which transcribed the Nth peer Nth voice into the Nth text packet, which has the confidence level higher than the predefined level, as the default ASR group and transmit the Nth text packet to the user (103). On the other hand, if the confidence level of all the text packets received from the primary group is lower than the predefined level, then the Nth voice frame is transmitted to the plurality of ASR groups.

At or after the termination of the call, the system purges any text packets that were not transferred to the user (103).

In an alternative embodiment, a system for identifying spoken language in a telecommunications relay service ("TRS") wherein automatic speech recognition ("ASR") engines transcribe and convert peer voices into text packets and the text packets are transmitted to a user (103), the system including a call serving entity (101); and a plurality of ASR groups (110), each of the ASR groups including an associated ASR engine that recognizes and transcribes speech to a predefined language.

The call serving entity (101) is configured to establish and release a voice path (V102) between the call serving entity (101) and a peer (102), and a voice path (V110) between the call serving entity (101) and the plurality of ASR groups (110); establish and release a data path (P103) between the call serving entity (101) and the user (103), and a data path (P110) between the call serving entity (101) and the plurality of ASR groups (110); receive the peer voices via the voice path (V102) and transmit the peer voices to the plurality of ASR groups (110); receive the text packets from the plurality of ASR groups (110) via the data path (P110); set, unset, or maintain a default ASR group; and transmit the text packets to a user (103) and/or discard the text packets.

As in the embodiment disclosed above, the default ASR group may be user-selected during initialization/setup of the system; selected automatically by the system based on any information provided by the user when signing up for (or subscribing to) the service provided by the system; peer-selected when on the peer may be prompted to select the language of which will designate the corresponding ASR group as the default ASR, the selection of which will be stored for that phone number; the system automatically determining the default ASR group during the call session, specifically the call serving entity (101) checking the confidence levels of the first text packet or the first few text packets produced by their respective ASR groups where the ASR group with the highest scoring text packet(s) at or above a confidence level will be set as the default ASR group; and/or, as the system receives more incoming calls from different peers and/or outgoing calls from the user, the default ASR group may be changed automatically by the call serving entity (101) based on the user's previous call history for that phone number by analyzing the confidence intervals scored to individual ASR groups for that particular phone number, where each ASR group corresponds to a different language.

In this embodiment, the call serving entity (101) is configured to check confidence levels of the text packets. The confidence levels are determined by each ASR engine and transmitted with the text packet to the call serving entity. the respective text packet from each ASR engine is evaluated based on its confidence level. One of the plurality of ASR groups (110) is set as the default ASR group. If the confidence level of any text packet received from the default ASR group is lower than a predefined level, then the call serving entity (101) is configured to increase a retry count incrementally if the confidence level of any text packet received from the default ASR group is lower than a predefined level. Preferably, this incremental increase of the retry count is by one. Furthermore, the retry count is zero by default. If the retry count exceeds the predefined level (may also be referred to as predefined maximum number), the call serving entity (101) is configured to unset the default ASR group.

If none of the ASR groups is set as the default ASR group, then the call serving entity (101) is configured to transmit a first text packet which has the confidence level higher than a predefined level to the user (103) via the data path (P103), and set the ASR group which transcribed a first voice frame to a first text packet having the confidence level higher than the predefined level as the default ASR group. If the first text packet having the confidence level higher than the predefined level is from the default ASR group, then the call serving entity (101) is configured to transmit the first text packet to the user (103) via the data path (P103), and maintain the default ASR group; or if one of the ASR groups (110) is set as the default ASR group but the first text packet having the confidence level higher than the predefined level is not from the default ASR group, then the call serving entity (101) is configured to discard the first text packet, increase a retry count incrementally, and receive a second text packet from the default ASR group.

Alternatively, if the first text packet is scored as having the requisite confidence level, is not derived from the default ASR, and the text packet from the default ASR does not the confidence threshold, then the call serving entity (101) may be further configured to transmit the first text packet to the user (103) in order to keep the latency between the peer and the user (103) reasonably low (at least 200 ms or below).

If the retry count exceeds a predefined maximum number (313), then the call serving entity (101) unsets (314) the default ASR group, transmits an Nth voice frame to the plurality of ASR groups, and thereafter receives an Nth text packet from the plurality of ASR groups (110) (see 315, FIG. 4), where N represents an integer and N is 1, 2, ... N (preferably 2 to maintain low latency). The call serving entity (101) is configured to set (309) the ASR group that transcribed the Nth voice frame into the Nth text packet having the confidence level higher than the predefined level as the default ASR group, release (310) peer voice/data paths other ASR groups, and transmit (308) the Nth text packet to the user (103). Once the default ASR group is determined this way, the call serving entity (101) may stop further assessment of the default ASR group.

In another embodiment, as illustrated in FIG. 4, a method for identifying spoken language in a TRS wherein ASR engines transcribe and convert a peer voice into text packets and the text packets are transmitted to a user (103), comprising the steps of: transmitting a peer voice from a call serving entity (101) to a default ASR group or a plurality of ASR groups (110); receiving (301) text packets that are generated by the default ASR group or the plurality of ASR groups (110); checking (303) confidence levels of each of the text packets; determining (304) the default ASR group; transmitting (308) the text packets to the user (103) and/or discarding (316) the text packets.

In this embodiment, the peer voice includes the first voice frame, second voice frame, third voice frame, fourth voice frame ... Nth voice frame where N is an integer. The first, second, third, fourth, ... Nth voice frame represents the peer voice of a call session over a time domain that are transcribed into the first, second, third, fourth, ... Nth text packets respectively by an ASR engine of an ASR group and these text packets are individually scored by the ASR engine. This score provided by the ASR group represents the confidence level of the transcription for the respective text packet. Accordingly, the text packet may include first, second, third, fourth, ... Nth text packets that are provided by the first ASR group (110*a*). For proper sequencing and delivery of the text packets to the user, timestamp data will be provided by the ASR engine for each text packet. The phone used for the incoming and/or outgoing call in this embodiment may be a cell phone, a touch-tone phone, a rotary phone, a voice over internet protocol (VoIP) phone, or any device used for voice communications between two or more parties.

In regards to the first text packet, the first text packet is transmitted (308) to the user (103) if the confidence level of the first text packet is higher than a predefined level and the first text packet is from the default ASR group. If the confidence level of the first text packet is higher than the predefined level and none of the plurality of ASR groups (110) is set as the default ASR group, then the first text packet is transmitted to the user (103). If the confidence level of the first text packet is lower than the predefined level, then the call serving entity (101) discards (316) the first text packet. If the confidence level of the first text packet is higher than the predefined level, one of the plurality of ASR groups (110) is set as the default ASR group, and the first text packet is not from the default ASR group, then the call serving entity (101) discards (316) the first text packet.

As shown in FIG. 4, the call serving entity (101) increases (312) a retry count number incrementally (preferably by interval(s) of one) if the confidence level of any of the text packets received from the default ASR group is lower than the predefined level. If the confidence level of a first text packet is higher than the predefined level, and the first text packet is not from the default ASR group, then one of the plurality of ASR groups (110) that produced the first text packet is set (309) as the default ASR group. The retry count is set (306) to zero by default with zero being the default value.

To determine the default ASR group, the method further includes the following steps: maintaining the preexisting default ASR group if the confidence level of the first text packet from the preexisting default ASR group is higher than the predefined level; unsetting (314) the default ASR group if the retry count exceeds a predefined maximum number; and setting (309) the ASR group that transcribed the first voice frame into the first text packet having the confidence level higher than the predefined level as the default ASR group if none of the ASR groups are set as the default ASR group. After setting (309) the ASR group, call serving entity (101) resets (306) the retry count number to the default value. Additionally, once the default ASR group is determined this way, the call serving entity (101) may stop further assessment of the default ASR group.

Each of the ASR groups (110) scores a confidence level for each of the first text packets transcribed by them, e.g. the first text packet provided by ASR group for language A receives a confidence level from the ASR engine included in the ASR group for language A, the first text packet provided by ASR group for language B receives a confidence level from the ASR engine included in the ASR group for language B, etc. Each of these text packets may be generated and scored simultaneously (or near-simultaneously) by their respective ASR groups. These confidence levels are checked (303) by the call serving entity (101) after the unsetting (314) step to determine whether the fidelity of the transcription meets a predetermined threshold confidence level. As shown in FIG. 3, the plurality of ASR groups (110) includes a primary language group. The Nth voice frame is transmitted to the primary language group and the confidence level of the Nth text packets are generated by the primary language group and checked by the call serving entity (101) after the unsetting step. Use of the first or even second text packets to determine the default ASR group reduces latency of the system to 200 ms or less.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A system for identifying spoken language in a telecommunications relay service ("TRS") wherein automatic speech recognition ("ASR") engines transcribe and convert peer voices into text packets, and the text packets transcribed from the peer voices are transmitted to a user, the system comprising:
   a call serving entity; and
   a plurality of ASR groups, each of the ASR groups including an associated ASR engine that recognizes and transcribes speech to a predefined language,
   wherein one of the plurality of ASR groups is set as a default ASR group,
   wherein the call serving entity is configured to:
      establish and release a voice path between the call serving entity and a peer, and a voice path between the call serving entity and the plurality of ASR groups;
      establish and release a data path between the call serving entity and the user, and a data path between the call serving entity and the plurality of ASR groups;
      receive the peer voices via the voice path and transmit the peer voices to the default ASR group, wherein the peer voices are transcribed and converted into the text packets by the default ASR group;
      receive the text packets from the default ASR group;
      set, unset, or maintain the default ASR group; and
      transmit the text packets to the user via the data path and/or discard the text packets,
   wherein the call serving entity is configured to check a confidence level of each text packet received from the default ASR group or from any of the plurality of ASR groups,
   wherein any text packet received from the default ASR group is transmitted to the user via the data path and the default ASR group is maintained if the confidence level is higher than a predefined level,
   wherein the call serving entity is configured to check a confidence level of each of the text packets received from the default ASR group or from any of the plurality of ASR groups,
   wherein any of the text packets received from the default ASR group or the plurality of ASR groups is discarded if the confidence level is lower than a predefined level,
   wherein if the confidence level of a first text packet received from the default ASR group is lower than the predefined level, the call serving entity is configured to increase a retry count incrementally, and receive a second text packet from the default ASR group.

2. The system of claim 1, wherein the peer voice includes an Nth voice frame,
   wherein if the confidence level of an Nth text packet transcribed from the Nth voice frame by the default ASR group is lower than the predefined level, the call serving entity is configured to increase a retry count incrementally,
   wherein if the retry count exceeds a predefined maximum number, the call serving entity is configured to unset the preexisting default ASR group, transmit the Nth voice frame to the plurality of ASR groups, and receive the Nth text packet from the plurality of ASR groups.

3. The system of claim 2, wherein the call serving entity is configured to set the ASR group that transcribed the Nth voice frame into the Nth text packet, which has the confidence level higher than the predefined level, as the default ASR group and transmit the Nth text packet to the user.

4. The system of claim 1, wherein the plurality of ASR groups further includes a primary language group,
   wherein the peer voice includes an Nth voice frame,
   wherein, if the confidence level of an Nth text packet transcribed from the Nth voice frame by the default ASR group is lower than the predefined level, then the call serving entity is configured to increase a retry count incrementally,
   wherein, if the retry count exceeds a predefined maximum number, then the call serving entity is configured to unset the default ASR group, transmit the Nth voice frame to the primary language group, and receive the Nth text packet from the primary language group.

5. The system of claim 4, wherein the call serving entity is configured to check the confidence level of the Nth text packet received from the primary language group,
   wherein, if the confidence level of any Nth text packet is higher than the predefined level, then the call serving entity is configured to set the ASR group which transcribed the Nth peer Nth voice into the Nth text packet, which has the confidence level higher than the predefined level, as the default ASR group and transmit the Nth text packet to the user, wherein, if the confidence level of all the text packets received from the primary group is lower than the predefined level, then the Nth voice frame is transmitted to the plurality of ASR groups.

6. A system for identifying spoken language in a telecommunications relay service ("TRS") wherein automatic speech recognition ("ASR") engines transcribe and convert peer voices into text packets and the text packets are transmitted to a user, the system comprising:
a call serving entity; and
a plurality of ASR groups, each of the ASR groups including an associated ASR engine that recognizes and transcribes speech to a predefined language,
wherein the call serving entity is configured to:
establish and release a voice path between the call serving entity and a peer, and a voice path between the call serving entity and the plurality of ASR groups;
establish and release a data path between the call serving entity and the user, and a data path between the call serving entity and the plurality of ASR groups;
receive the peer voices via the voice path and transmit the peer voices to the plurality of ASR groups;
receive the text packets from the plurality of ASR groups via the data path;
set, unset, or maintain a default ASR group; and
transmit the text packets to a user and/or discard the text packets,
wherein the call serving entity is configured to check confidence levels of the text packets,
wherein:
if none of the ASR groups is set as the default ASR group, then the call serving entity is configured to transmit a first text packet which has the confidence level higher than a predefined level to the user via the data path, and set the ASR group which transcribed a first peer voice to a first text packet having the confidence level higher than the predefined level as the default ASR group;
if the first text packet having the confidence level higher than the predefined level is from the default ASR group, then the call serving entity is configured to transmit the first text packet to the user via the data path, and maintain the default ASR group; or
if one of the ASR groups is set as the default ASR group but the first text packet having the confidence level higher than the predefined level is not from the default ASR group, then the call serving entity is configured to discard the first text packet, increase a retry count incrementally, and receive a second text packet from the default ASR group.

7. The system of claim 6, wherein one of the plurality of ASR groups is set as the default ASR group,
wherein the call serving entity is configured to increase a retry count incrementally if the confidence level of any text packet received from the default ASR group is lower than a predefined level,
wherein the call serving entity is configured to unset the default ASR group if the retry count exceeds a predefined maximum number.

8. The system of claim 6, wherein the peer voice includes an Nth voice frame,
wherein if the retry count exceeds a predefined maximum number, the call serving entity is configured to unset the default ASR group, transmit the Nth voice frame to the plurality of ASR groups, and receive an Nth text packet from the plurality of ASR groups.

9. The system of claim 8, wherein the call serving entity is configured to set the ASR group that transcribed the Nth voice frame into the Nth text packet having the confidence level higher than the predefined level as the default ASR group, and transmit the Nth text packet to the user.

10. A method for identifying spoken language in a telecommunications relay service ("TRS") wherein automatic speech recognition ("ASR") engines transcribe and convert a peer voice into text packets and the text packets are transmitted to a user, comprising the steps of:
transmitting a peer voice from a call serving entity to a default ASR group or a plurality of ASR groups;
receiving text packets that are generated by the default ASR group or the plurality of ASR groups;
checking confidence levels of each of the text packets;
determining the default ASR group;
transmitting the text packets to the user and/or discarding the text packets,
wherein the method further comprises the following steps:
increasing a retry count number incrementally if:
the confidence level of any of the text packets received from the default ASR group is lower than the predefined level; or
the confidence level of a first text packet is higher than the predefined level, one of the plurality of ASR groups is set as the default ASR group, and the first text packet is not from the default ASR group,
wherein the text packets include the first text packet.

11. The method of claim 10,
wherein the text packets include a first text packet,
wherein the first text packet is transmitted to the user if the confidence level of the first text packet is higher than a predefined level and the first text packet is from the default ASR group,
wherein the first text packet is transmitted to the user if the confidence level of the first text packet is higher than the predefined level and none of the plurality of ASR groups is set as the default ASR group,
wherein the first text packet is discarded if the confidence level of the first text packet is lower than the predefined level, and
wherein the first text packet is discarded if the confidence level of the first text packet is higher than the predefined level, one of the plurality of ASR groups is set as the default ASR group, and the first text packet is not from the default ASR group.

12. The method of claim 10, wherein the peer voice includes a first peer voice,
wherein the step of determining the default ASR group includes the following steps:
maintaining the preexisting default ASR group if the confidence level of the first text packet from the preexisting default ASR group is higher than the predefined level;
unsetting the default ASR group if the retry count exceeds a predefined maximum number; and
setting the ASR group that transcribed the first peer voice into the first text packet having the confidence level higher than the predefined level as the default ASR group if none of the ASR groups are set as the default ASR group.

13. The method of claim 12, wherein the retry count number is reset to a default value after the setting step,
wherein the peer voice further includes an Nth voice frame, wherein the text packets further include an Nth text packet, wherein the Nth voice frame is transmitted to the plurality of ASR groups and the confidence level of the Nth text packets are generated by each of the ASR groups and checked by the call serving entity after the unsetting step.

14. The method of claim 12, wherein the plurality of ASR groups comprises a primary language group, wherein the peer voice further includes an Nth voice frame, wherein the text packets further include an Nth text packet, wherein the Nth voice frame is transmitted to the primary language group and the confidence level of the Nth text packets are generated by the primary language group and checked by the call serving entity after the unsetting step.

15. A system for identifying spoken language in a telecommunications relay service ("TRS") wherein automatic speech recognition ("ASR") engines transcribe and convert peer voices into text packets and the text packets are transmitted to a user, the system comprising:

a call serving entity; and a plurality of ASR groups, each of the ASR groups including an associated ASR engine that recognizes and transcribes speech to a predefined language, wherein the call serving entity is configured to:

establish and release a voice path between the call serving entity and a peer, and a voice path between the call serving entity and the plurality of ASR groups;

establish and release a data path between the call serving entity and the user, and a data path between the call serving entity and the plurality of ASR groups;

receive the peer voices via the voice path and transmit the peer voices to the plurality of ASR groups;

receive the text packets from the plurality of ASR groups via the data path;

set, unset, or maintain a default ASR group; and transmit the text packets to a user and/or discard the text packets, wherein the call serving entity is configured to check confidence levels of the text packets, wherein one of the plurality of ASR groups is set as the default ASR group, wherein the call serving entity is configured to increase a retry count incrementally if the confidence level of any text packet received from the default ASR group is lower than a predefined level, wherein the call serving entity is configured to unset the default ASR group if the retry count exceeds a predefined maximum number.

16. A method for identifying spoken language in a telecommunications relay service ("TRS") wherein automatic speech recognition ("ASR") engines transcribe and convert a peer voice into text packets and the text packets are transmitted to a user, comprising the steps of:

transmitting a peer voice from a call serving entity to a default ASR group or a plurality of ASR groups;

receiving text packets that are generated by the default ASR group or the plurality of ASR groups;

checking confidence levels of each of the text packets;

determining the default ASR group;

transmitting the text packets to the user and/or discarding the text packets, wherein the text packets include a first text packet, wherein the first text packet is transmitted to the user if the confidence level of the first text packet is higher than a predefined level and the first text packet is from the default ASR group, wherein the first text packet is transmitted to the user if the confidence level of the first text packet is higher than the predefined level and none of the plurality of ASR groups is set as the default ASR group, wherein the first text packet is discarded if the confidence level of the first text packet is lower than the predefined level, and wherein the first text packet is discarded if the confidence level of the first text packet is higher than the predefined level, one of the plurality of ASR groups is set as the default ASR group, and the first text packet is not from the default ASR group.

* * * * *